United States Patent
Pearce

[11] 3,716,902
[45] Feb. 20, 1973

[54] METHOD OF MAKING A COMPOSITE WELDING TORCH TIP

[75] Inventor: Harry T. Pearce, Altoona, Pa. 16603

[73] Assignee: Small Tube Products, Inc., Altoona, Pa.

[22] Filed: Feb. 18, 1970

[21] Appl. No.: 12,223

[52] U.S. Cl. ............... 29/157 C, 29/417, 29/DIG. 11, 219/136
[51] Int. Cl. ..................... B23p 15/26, B23p 17/00
[58] Field of Search ............. 29/DIG. 11, 157 C, 417; 239/591; 219/136, 74

[56] References Cited

UNITED STATES PATENTS

| | | | |
|---|---|---|---|
| 3,523,359 | 8/1970 | Spikes | 29/157 C X |
| 2,243,184 | 5/1941 | Aronson et al. | 29/157 C |
| 2,468,824 | 5/1949 | Hughey | 29/157 C X |
| 3,104,432 | 9/1963 | Peterson | 29/157 C |
| 3,267,563 | 8/1966 | Seaton | 29/157.3 A |
| 3,431,391 | 3/1969 | Ehrenstein et al. | 219/130 |
| 3,444,353 | 5/1969 | Wilson | 219/136 |

Primary Examiner—Charles W. Lanham
Assistant Examiner—Donald C. Reiley, III
Attorney—Smith, Harding, Earley & Follmer

[57] ABSTRACT

Welding torch tips and cutting torch tips made from drawn copper tubing instead of conventional copper rod with its expensive drilled-out holes.

A torch tip comprising an inner copper tube having a desired inner diameter, an outer copper tube drawn onto the inner tube and drawn to a desired outer diameter to form a combined tube, a nozzle formed on one end of the combined tube, and threads formed on the other end for attachment to a torch. The wall of the inner tube is thinner than the wall of the outside tube. If the torch tip is to be used for cutting, a plurality of radially spaced flutes are formed in the inner surface of the outer tube. If the torch tip is to be used for welding, the inner tube may be made of a lead-brass alloy that is resistant to wear of the welding wire passing therethrough.

A method of making a torch tip comprising the steps of taking an inner seamless copper tube, drawing said inner tube to a desired inner and outer diameter, cutting said inner tube into sections and annealing them, drawing said inner sections to desired inner and outer diameter, taking an outer tube, drawing said outer tube to a desired outer and inner diameter, cutting said outer tube into sections and annealing them, inserting an inner tube section into an outer tube section, drawing the tube sections together into a combined tube section, trimming and straightening the combined tube sections, cutting the combined sections to tip-length units, swaging one end of each tip unit into a cone shape to form a nozzle, and threading the other end of each tip unit to adapt it for attachment to a torch. If the torch tip is to be used for cutting, the method includes the step of forming a plurality of inner flutes on the inner surface of the outer tube during the drawing operation before insertion therein of the inner tube.

5 Claims, 18 Drawing Figures

PATENTED FEB 20 1973  3,716,902

INVENTOR
HARRY T. PEARCE
BY
ATTORNEYS

INVENTOR

HARRY T. PEARCE

BY

Smith Harding Earley & Follmer

ATTORNEYS

METHOD OF MAKING A COMPOSITE WELDING TORCH TIP

BACKGROUND OF THE INVENTION

Conventional torch tips for welding and cutting have been made from copper rods which are axially drilled to form passageways for oxygen, a gas such as acetylene, and/or a welding wire. This drilling operation is expensive because of the time involved and also because of the cost of the drilled-away material.

Because of the high cost of conventional drilled copper torch tips, it has long been desired to make such torch tips from copper tubing. However, with tubing, it is difficult to obtain the close tolerances required of the inside and outside diameter of the torch tips.

Attempts have been made to use tubing having an inside diameter larger than that required, and then swaging the tubing until the inside diameter is of the proper size. However, this swaging operation is expensive so that the resulting tips had no cost advantage over the conventional drilled copper rod.

Another problem with arc welding tips is that the welding wire which passes through the central passageway of the tip wears away the tip until it is no longer useful and has to be discarded.

Besides the difficulty of obtaining the proper inner and outer diameter of welding torch tips made from tubing, the cutting torch tip made from tubing presented the problem of how to provide passageways positioned radially about the central passageway. These radially positioned passageways pass inert gases that surround the oxygen emitted from the central passageway to protect the oxygen from contamination by the surrounding air and also to heat the work object to a desired temperature so that when the oxygen is turned on it cleanly cuts through the work object.

SUMMARY OF THE INVENTION

The present invention solves the above-mentioned problems by providing a torch tip made from two drawn copper tubes which are drawn together to form a combined tube. The tubes are reduced to desired inner and outer diameters by one or more drawing steps, the inner tube is inserted inside the outer tube, and then both tubes are drawn to form a combined tube of the desired outer and inner diameters.

Whereas a single thick-walled tube is difficult to draw to desired outer and inner diameters. I have found that satisfactory results may be obtained by drawing a thin wall inner tube to approximate inner diameter, drawing an outer tube to approximate outside diameter, inserting them, and drawing both together to form a combined tube having the desired inner and outer diameters. I have also found that it is easier to obtain accurate results if the inner tube is of thinner wall construction than the outer tube.

Further, by providing an inner tube made of wear-resistant material, such as a lead-brass alloy, it has been found that the welding wire does not wear away the torch tip as quickly, thus giving the welding torch tip a longer life.

Radially spaced passageways for gas in a cutting tip have been provided by drawing the outer tube onto a mandrel having ridges that form flutes on the inner surface of the outer tube. Thereafter, when a nozzle is being formed on one end of the combined tube section by swaging the outer surface thereof into a cone-shape, piano wires are placed in the flutes and removed after the swaging operation in order to keep open the passageways formed by the flutes.

DESCRIPTION OF THE PREFERRED EMBODIMENTS

Figure 1:
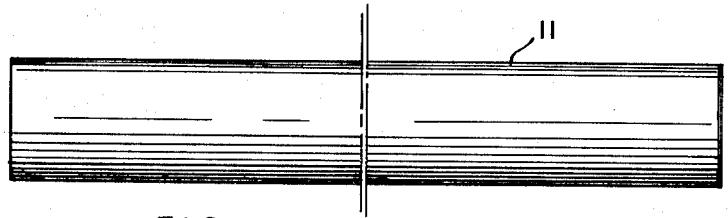
FIG. 1 is a view in side elevation of an outer tube.
Figure 2:
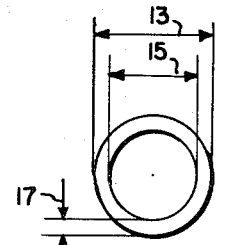
FIG. 2 is a view in end elevation of the tube of FIG. 1.
Figure 3:
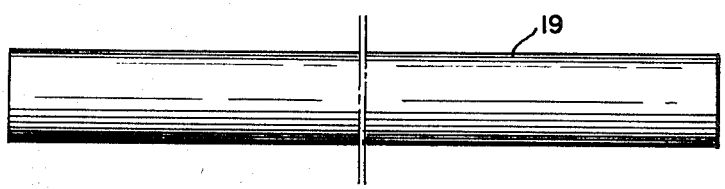
FIG. 3 is a view in side elevation of an inner tube.
Figure 4:
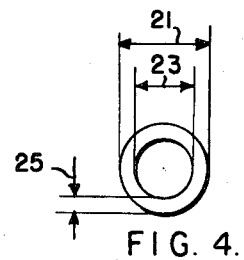
FIG. 4 is a view in end elevation of the tube of FIG. 3.
Figure 5:
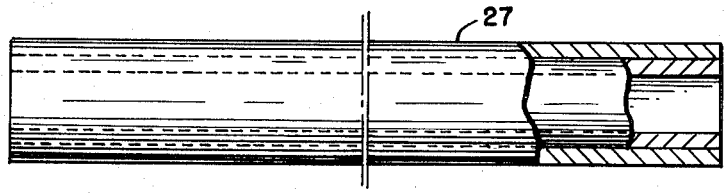
FIG. 5 is a view in side elevation of a combined-tube.
Figure 6:
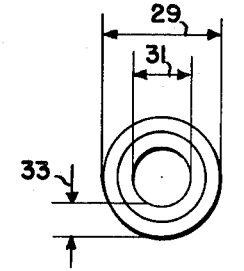
FIG. 6 is a view in end elevation of the combined-tube of FIG. 5.
Figure 8:
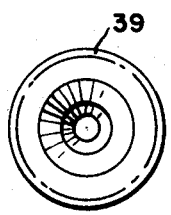
FIG. 8 is a view in end elevation looking from the left of FIG. 7.
Figure 7:
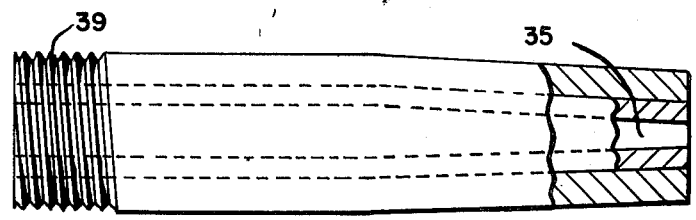
FIG. 7 is a view in side elevation of a combined-tube welding torch tip.
Figure 9:
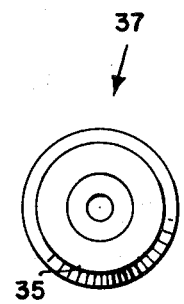
FIG. 9 is a view in end elevation looking from the right of FIG. 7.
Figure 10:
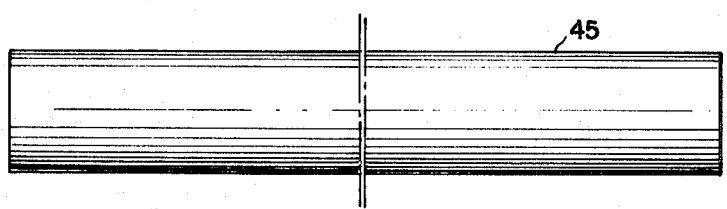
FIG. 10 is a view in side elevation of an outer tube.
Figure 11:
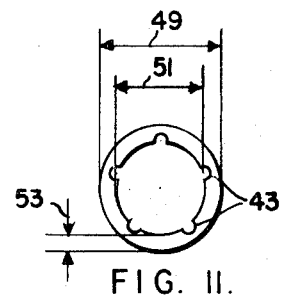
FIG. 11 is a view in end elevation of the tube of FIG. 10.
Figure 12:
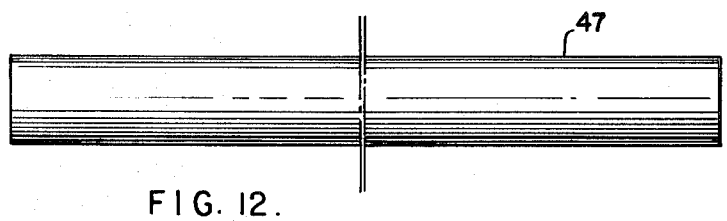
FIG. 12 is a view in side elevation of an inner tube.
Figure 13:
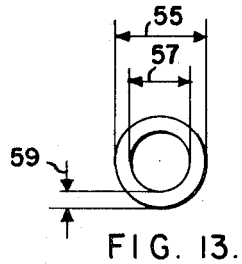
FIG. 13 is a view in end elevation of the tube of FIG. 12.
Figure 14:
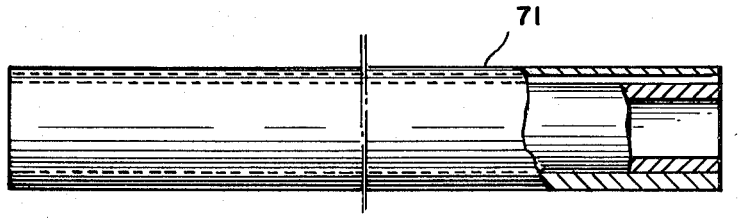
FIG. 14 is a view in side elevation of a combined-tube.
Figure 15:
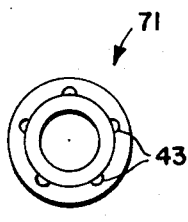
FIG. 15 is a view in end elevation of the combined-tube of FIG. 14.

Turning now to the specific embodiments of the invention selected for illustration in the drawings, there is shown an outer tube 11 having an outer diameter 13, an inner diameter 15, and a wall thickness 17. Outer tube 11 is made of metal such as copper and is seamless.

Also shown is an inner tube 19 having an outer diameter 21, inner diameter 23, and a wall thickness 25. Inner tube 19 is also made of metal such as copper and is seamless. The wall of inner tube 19 is thinner than the wall of outer tube 11. Also, inner tube 19 may be made of a copper alloy such as a lead-copper alloy that is resistant to wear.

Outer tube 11 and inner tube 19 are cold drawn tubes, and form the starting materials for a method of making a torch tip having a desired outer and inner diameter and wall thickness, which comprises the steps of taking an inner seamless copper tube 19 from a reel, drawing inner tube 19 through a carbide die to desired inner and outer diameters, cutting the drawn inner tube 19 into sections for easier handling, annealing the inner tube sections, drawing said inner tube sections to a desired inner and outer diameter, taking an outer seamless copper tube 11 from a reel, drawing the outer tube 11 to desired inner and outer diameters, cutting outer tube 11 into sections for easier handling, annealing the outer tube sections, inserting an inner tube 19 section into an outer tube 11 section, drawing the inner and outer tube sections together into a combined tube section 27 having an outer diameter 29, an inner diameter 31, and a wall thickness 33, trimming and straightening the combined tube section 27, cutting the combined tube sections 27 into torch tip units of a desired length, swaging one end of each tip unit into a cone shape to form a nozzle such as nozzle 35 of combined-tube welding torch tip 37, and threading the other end of each tip unit to adapt it for attaching to a torch such as by forming or cutting threads 39. The nozzle is formed to increase the exit velocity of the oxygen and other gases.

Figures 16, 17:
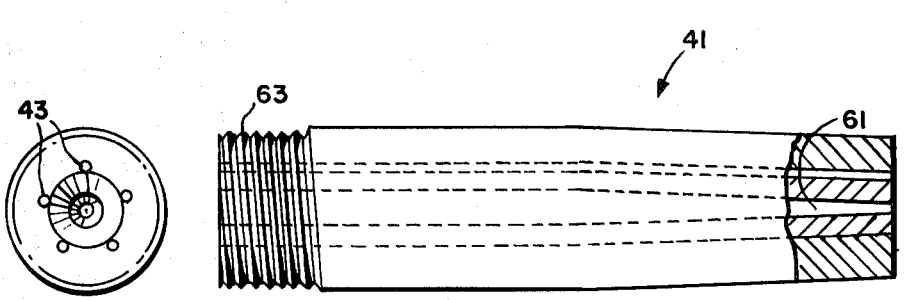
FIG. 16 is a view in side elevation of a combined-tube cutting-torch tip.
FIG. 17 is a view in end elevation looking from the left of FIG. 16.
Figure 18:
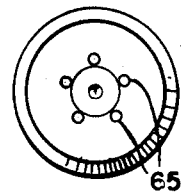
FIG. 18 is a view in end elevation looking from the right of FIG. 16.

The steps in my method of forming a combined-tube cutting-torch tip 41 shown in FIGS. 16–18 are the same as for the method of making welding torch tip 37 except that the cutting-torch method includes a step of forming a plurality of inner flutes 43 on the inner surface of an outer tube 45 while drawing tube 45 to desired inner and outer diameters before insertion of inner tube 47 therein.

The starting materials for making cutting-torch tip 41 includes outer tube 45 having an outer diameter 49, an inner diameter 51, and a wall thickness 53, and an inner tube 47 having an outer diameter 55, an inner diameter 57, and a wall thickness 59.

Cutting-torch tip 41 includes one end which has been swaged into a cone shape to form a nozzle 61. Threads 63 have been cut into the other end to adapt it for attachment to a torch. Cutting-torch tip 41 also includes radially spaced passageways 65 which conduct gas and have been formed from flutes 43. Cutting-torch tip 41 includes an outer tube 45 and an inner tube 47, with the wall of inner tube 47 being thinner than the wall of outer tube 45.

Having thus described by invention generally, I will now more specifically describe it by using the following examples.

EXAMPLE 1

To make a welding-torch tip having an outer diameter of 0.250 inch, an inner diameter of 0.045 inch, and a length of 2,125 inches, my method includes the steps of taking an inner seamless copper tube 19 having a 0.295 inch outer diameter 21 × 0.203 inch inner diameter 23 × 0.046 inch wall thickness 25, drawing inner tube 19 over a plug or mandrel to 0.202 inch outer diameter × 0.116 inch inner diameter × 0.043 inch wall thickness, cutting drawn inner tube 19 into 0.55 lb. sections, annealing said inner tube sections, drawing said inner tube sections to 0.1265 inch outer diameter × 0.0465 inch inner diameter × 0.040 inch wall thickness, taking an outer seamless copper tube 11 of 0.409 inch outer diameter 13 × 0.277 inch inner diameter 15 × 0.066 inch wall thickness 17, drawing outer tube 11 over a plug or mandrel to 0.295 inch outer diameter × 0.170 inch inner diameter × 0.0625 inch wall thickness, cutting outer tube 11 into 1.18 lb sections for easier handling, annealing said outer tube sections, inserting one of said drawn inner tube 19 sections into one of said drawn outer tube 11 sections, drawing the two sections together into a combined tube section 27 with a 0.250 inch outer diameter 29 × 0.045 inch inner diameter 31 × 0.1025 inch wall thickness 33, trimming and straightening the combined tube section 27, cutting the combined section 27 into 2.125 inch tip units, swaging one end of each tip unit into a cone shape to form nozzle 35, and cutting threads 39 at the other end of each tip for attachment to a torch.

EXAMPLE 2

To make a torch tip having an outer diameter of 0.250 inch, an inner diameter of 0.045 inch, and a length of 2.125 inches, but with an inner surface of a wear-resistant material, the steps of Example 1 were followed except that inner tube 19 was made of a wear-resistant material, such as lead-copper alloy, beryllium copper, DHP (deoxidized high phosphorous) copper, or DLP (dioxidized low phosphorous) copper.

EXAMPLE 3

To make a cutting-torch tip having an outer diameter of 0.250 inch, an inner diameter of 0.045 inch, and a length of 2.125 inches, my method comprises the steps of taking an inner seamless copper tube 47 having a 0.295 inch outer diameter 55, a 0.203 inch inner diameter 57, and a 0.046 inch wall thickness 59, drawing said inner tube 47 over a plug or mandrel to 0.202 inch outer diameter × 0.116 inch inner diameter × 0.043 inch wall thickness, cutting said inner tube into 0.55 pound sections, annealing said inner tube sections, drawing said inner tube sections to 0.1265 inch outer diameter × 0.0465 inch inner diameter × 0.040 inch wall thickness, taking an outer seamless copper tube 45 of 0.409 inch outer diameter 49 × 0.277 inch inner diameter 51 × 0.066 inch wall thickness 53, drawing said outer tube 45 over a ridged mandrel to form an outer tube having five flutes and a 0.295 inch outer diameter × 0.170 inch inner diameter × 0.0625 inch outer wall thickness, cutting the outer tube 45 into 1.18 pound sections for easier handling, annealing said outer tube 45 sections, inserting an inner tube 47 section into an outer tube 45 section, drawing the tubes together into a combined tube section 71 with a 0.250 inch outer diameter × 0.045 inch inner diameter × 0.1025 inch wall thickness and having five radially spaced passageways 65, trimming and straightening the combined tube sections, cutting the combined sections into 2.125 inch tip units, swaging one end of each tip unit into a cone-shape to form a nozzle 61, and cutting threads 63 into the other end of each cutting-torch tip 41 to adapt it for attachment to a torch.

EXAMPLE 4

To make a cutting torch tip having an outer diameter of 0.5285 inch, an inner diameter of 0.125 inch, and a length of 2.125 inches, my method comprises the steps of taking an inner seamless copper tube 47 having a 0.731 inch outer diameter 55, a 0.339 inch inner diameter 57, and a 0.166 inch wall thickness 59, drawing said inner tube 55 to 0.502 inch outer diameter × 0.206 inch inner diameter × 0.148 inch wall thickness, cutting said inner tube into 4.57 pound sections, annealing said inner tube sections, drawing said inner tube sections to 0.388 inch outer diameter × 0.125 inch inner diameter × 0.1315 inch wall thickness, taking an outer seamless copper tube 45 of 0.920 inch outer diameter 49 × 0.670 inch inner diameter 51 × 0.125 inch wall thickness 53, drawing said outer tube 45 over a mandrel to form an outer tube having a 0.733 inch outer diameter × 0.541 inch inner diameter × 0.096 inch wall thickness, cutting the outer tube 45 into 5.71 pound sections for easier handling, annealing said outer tube 45 sections, drawing said drawn outer tube 45 sections over a mandrel having ridges to form a fluted outer tube 45 with five flutes 43 and having a 0.550 outer diameter × 0.403 inner diameter × 0.0735 inch wall thickness, inserting an inner tube 47 section into an outer tube 45 section, drawing the tubes together into a combined tube section 71 with a 0.5285 inch outer diameter × 0.125 inch inner diameter × 0.20175 inch wall thickness and having five radially spaced passageways 65, trimming and straightening the combined tube sections, cutting the combined sections into 2.125 inch tip units, swaging one end of each tip unit into a cone-shape to form a nozzle 61, and cutting threads 63 into the other end of each cutting-torch tip 41 to adapt it for attachment to a torch.

OPERATION

In operation, the tips are attached to a torch and operated in the same manner as conventional torch tips made of copper rods with drilled-out passageways.

The welding torch tip produced in accordance with Example 1 herein must be produced at close tolerances because the 0.045 inch inner diameter of tip 37 must accommodate a 0.035 inch welding wire. Since during the actual welding operation, the welding wire heats and expands to 0.039 inch, the tolerance of inner diameter of tip 37 is quite critical. This inner diameter must also allow for the bow in the welding wire, since the welding wire is hard and is fed from a coil. Wear becomes a problem with heavier welding wires because of this bow, and inner tubes made of a wear-resistant copper alloy become advantageous in order to combat and resist this wear. The combined tube welding tip of this invention provides satisfactory electrical conductivity and cooling because of the mass of the copper, provides close tolerance between the inner diameter and the welding wire, and also provides increased resistance to wear of the inner diameter of the welding tip.

In cutting torch tip 41, the invention provides uniformly spaced passageways 65 for oxyacetylene gases which surround the inner passageway that carries the oxygen jet.

The inner diameter 31 of welding tip 37 maintains electrical contact with the welding wire without undue wearing of the inner surface of the passageway.

In forming the nozzles, piano wires are inserted in the central passageway and in the flutes during the swaging operation when the nose of the tube is swaged down to size. After the swaging operation, the piano wires are pulled out. In forming the cutting tip of Example 4, a 0.090 diameter piano wire is inserted in the oxygen hole while the nose of the tube is being swaged into a nozzle.

The torch tips of Example 1 satisfactorily met the required tolerances of plus or minus 0.002 inch for the 0.250 inch outer diameter, and plus or minus 0.001 inch for the 0.045 inch inner diameter.

Instead of making torch tip conventionally by drilling holes in to copper rods, such drilling costing about twenty cents a hole, in accordance with my invention, piano wires are placed in the oxygen and gas holes and one end of the tip unit is swaged into a nozzle.

In addition to the expense of drilling holes in the conventional copper rod, a substantial portion of copper is wasted by machining to form a conventional collar for attachment to a torch. My invention eliminates this waste.

The more holes in the acetylene circle of holes, the better the shield of the oxygen coming from the central passageway. In the conventional drilled rod, it is not easy to drill a multiplicity of holes close together. In my invention, it is easy to form a large number of flutes spaced closely together that eventually form the oxyacetylene passageways.

Initially, the flutes are U-shaped in cross section, but in swaging the nozzle, the metal sides of the flutes flow around the piano wires, which are flexible but of very hard steel, to form passageways that are substantially circular in cross section. After the swaging operation, the wires are pulled out of the passageways.

The present invention eliminates drilling and swaging by producing a combined tube, with a controlled inner and outer diameter. Moreover, my tip contains more pure copper than conventional tips which include ingredients other than copper for easier machining, i.e., for easier turning of the copper slugs in automatic screw machines to drill the holes and to take off the outside copper to form the attachment collar.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed such as by forming the flutes on the outer diameter of the inner tube, and certain features of the invention may be utilized independently of the use of other features, all without departing from the spirit or scope of the invention as defined in the subjoined claims.

I claim:

1. In a method of making a cutting torch tip, the steps comprising drawing an inner metallic tube to desired initial outer and inner diameters with an outer contact surface adapted to contact the inner contact surface of an outer metallic tube, drawing an outer metallic tube to desired initial outer and inner diameters with an inner contact surface adapted to contact the outer contact surface of an inner metallic tube, drawing flutes into one of said contact surfaces, inserting the inner tube into the outer tube, and drawing the inner and outer tubes together to form a combined tube section having desired outer and inner diameters and drawing said flutes and the surface contacted thereby to form radially spaced passageways surrounding a central passageway.

2. The method of claim 1, wherein said flutes are drawn in the inner contact surface of said outer tube.

3. A method of making a cutting torch tip, comprising the steps of taking an inner seamless copper tube from a reel, drawing said inner tube through a die to desired inner and outer diameters, cutting the drawn inner tube into sections for easier handling, annealing said inner tube sections, drawing said inner tube sections into desired inner and outer diameters, taking an outer seamless copper tube, drawing the outer tube to desired inner and outer diameters and drawing flutes in the inner surface of said outer tube, cutting the outer tube into sections for easier handling, annealing said outer tube sections, inserting an inner tube section into an outer tube section, drawing the inner and outer tube sections together to form a combined tube section having desired outer and inner diameters and wall thickness and radially spaced passageways, trimming and straightening the combined tube sections, cutting the combined tube sections into cutting torch tip units of a desired length, swaging one end of each tip unit into a cone-shape to form a nozzle, and cutting threads into the other end of each cutting-torch tip to adapt it for attachment to a cutting torch.

4. In a method of making a composite welding torch tip section having a smooth bore of very close tolerance which defines a central passageway so that during use of the welding torch tip contact is made with the welding wire substantially all along the central passageway, said method comprising the steps of drawing an outer copper tube to produce a permanent reduction in its outer and inner diameters to obtain desired initial outer and inner diameters and wall thickness, taking an inner tube of wear-resistant copper alloy having a substantially thinner wall thickness than said outer tube, drawing said inner tube to produce a permanent reduction in its outer and inner diameters to obtain desired initial outer and inner diameters, said drawn inner tube having a substantially thinner wall thickness than said drawn outer tube, assembling the drawn outer tube over the drawn inner tube, and drawing the assembled inner and outer tubes together simultaneously through a die sized to produce a permanent reduction in the outer diameter of the outer tube and in the inner diameter of the inner tube to form the composite welding torch tip section having a very close tolerance smooth bore with a desired inner diameter.

5. A method of making a composite welding torch tip having a smooth bore of very close tolerance which defines a central passageway so that during use of the welding torch tip contact is made with the welding wire substantially all along the central passageway, said method comprising the steps of taking an outer seamless copper tube having initial outer and inner diameters and wall thickness, drawing said outer tube to produce a permanent reduction in its outer and inner diameters to obtain desired diameters and wall thickness, cutting said drawn outer tube into sections, annealing said outer tube sections, drawing said annealed outer tube sections to desired diameters and wall thickness, taking an inner seamless tube of a wear-resistant copper alloy having initial inner and outer diameters and a substantially thinner wall thickness than said outer tube, drawing said inner tube to produce a permanent reduction in its outer and inner diameters to obtain desired diameters and wall thickness, said drawn inner tube having a substantially thinner wall thickness than said drawn outer tube, cutting said drawn inner tube into sections, annealing said inner tube sections, assembling one of said outer tube sections onto one of said inner tube sections, drawing the assembled sections together simultaneously through a die sized to produce a permanent reduction in the outer diameter of the outer tube section and in the inner diameter of the inner tube section to form a combined tube section having a smooth bore of very close tolerance with a desired inner diameter adapted to contact a welding wire fed therethrough, trimming and straightening the combined tube section, cutting the combined section into tip units, trimming one end of each tip unit into cone shape, and threading the other end of each tip unit to adapt it for attachment to a welding torch, whereby to form the composite welding torch tip.

* * * * *